W. T. WALKER.
Cultivators.

No. 138,964. Patented May 13, 1873.

UNITED STATES PATENT OFFICE.

WILLIAM T. WALKER, OF FONTENOY MILLS, GEORGIA.

IMPROVEMENT IN CULTIVATORS.

Specification forming part of Letters Patent No. 138,964, dated May 13, 1873; application filed March 22, 1873.

*To all whom it may concern:*

Figure 1:
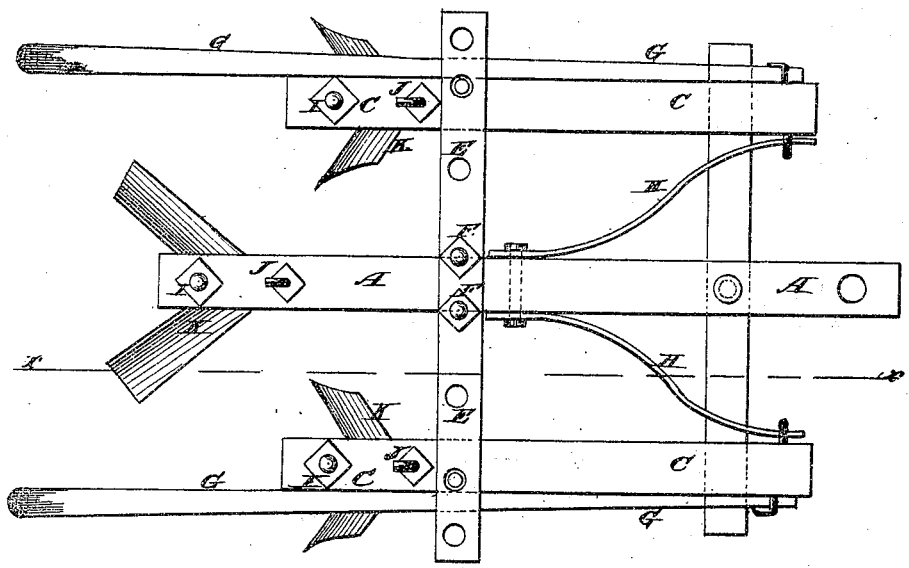
Figure 2:
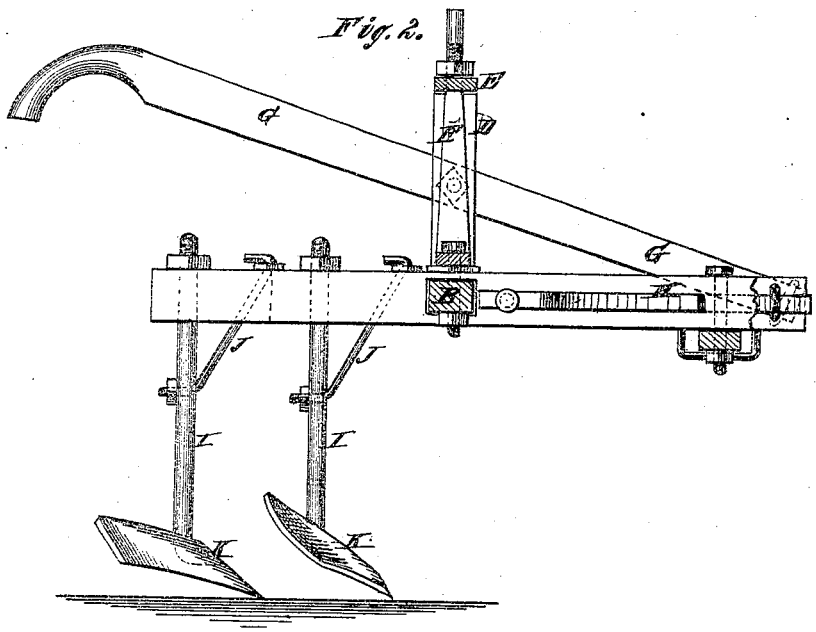

Be it known that I, WILLIAM T. WALKER, of Fontenoy Mills, in the county of Green and State of Georgia, have invented a new and useful Improvement in Cultivator, of which the following is a specification:

Figure 1 is a top view of my improved cultivator. Fig. 2 is a detail longitudinal section of the same, taken through the line $x\ x$, Fig. 1.

Similar letters of reference indicate corresponding parts.

My invention consists in the arrangement of springs with the pivoted and stationary beams of a cultivator, as hereinafter described.

A represents the central beam, to the forward end of which the draft is applied. To the middle part of the beam A is secured the middle part of the cross-bar B, the ends of which pass through slots in the side beams C, which are pivoted to said ends by round tenons formed upon the lower ends of the uprights D, which have round tenons formed upon their upper ends to enter holes in the cross-bar E, parallel with the cross-bar B. The cross-bars B and E have several holes formed in them to receive the round tenons of the uprights D, so that the side beams C may be readily adjusted wider apart or closer together by moving the uprights D from one to another of said holes. The cross-bar B is secured to the central beam A by the standard F, the upper part of which is made forked, and to it is attached the upper cross-bar E. To the middle parts of the uprights D are bolted the handles G, the forward ends of which are connected with the forward ends of the side beams C. The forward ends of the side beams C are held out from the forward end of the central beam A by the springs H, the rear ends of which are secured to the opposite sides of the said central beam A, and the forward ends of which rest against the inner sides of the forward ends of the side beams C, where they are kept in place by passing through keepers attached to said beams C. I are the plow-standards, which are attached to the rear ends of the beams C A C, and the draft-strain upon them is sustained by the draft-rods J. To the lower ends of the standards I are attached sweeps K, or other plows, as may be desired. By this construction, by operating the handles G the side-plows may be moved inward or outward, as may be desired, and together or separately, as may be required.

Having thus described my invention, I claim as new and desire to secure by Letters Patent—

The springs H H secured to the fixed central beam A, and connected at their free ends with the pivoted and handled side beams C C by means of staples or other equivalent guides, as shown and described, to operate as specified.

WILLIAM T. WALKER.

Witnesses:
R. M. JACKSON,
LINDSEY DURHAM.